July 30, 1968

F. F. ERDELYI 3,394,570

APPARATUS FOR PRODUCING TEETH ON CYLINDRICAL
BODIES BY ROLLING

Filed May 12, 1965

Frank F. Erdelyi
INVENTOR.

BY
Beaman & Beaman
attys

July 30, 1968     F. F. ERDELYI     3,394,570
APPARATUS FOR PRODUCING TEETH ON CYLINDRICAL
BODIES BY ROLLING
Filed May 12, 1965                                                        7 Sheets-Sheet 5

Frank F. Erdelyi
INVENTOR.

BY
Beaman & Beaman
Attys

United States Patent Office 3,394,570
Patented July 30, 1968

3,394,570
APPARATUS FOR PRODUCING TEETH ON
CYLINDRICAL BODIES BY ROLLING
Frank F. Erdelyi, 5703 Deblin Ave., Deblin Park,
Raleigh, N.C. 27609
Filed May 12, 1965, Ser. No. 455,238
Claims priority, application Germany, May 16, 1964,
E 27,059
12 Claims. (Cl. 72—106)

ABSTRACT OF THE DISCLOSURE

The invention pertains to apparatus for producing gears by rolling a workpiece wherein the rolling wheel forming the gear teeth is a counter-involute of the teeth to be formed. The apparatus utilizes a master wheel directly driving a plurality of rolling wheels, and the workpiece is clamped between rotatable and axially translatable spindles adjacent the master wheel. Preferably, the axis of rotation of the rolling wheels is obliquely related to the axis of the workpiece to aid in the formation of the gear teeth, and augment feeding of the workpiece into the tooth rolling wheels.

---

It is known to manufacture toothed wheels, in particular spur gears, by rolling. In this connection, both rolling of spur gears in the cold state and rolling in the heated state are known, the heating in the latter case being carried out at forging temperature.

With the known methods and apparatus, the profiling of the toothing of a cylindrical gear may be carried out either in the radial direction or in the axial direction. The reference profiles of the rolling tools proceed either from the pure trapezoidal form of a rack (for example the flat-jaw rolling method) or from cycloidal or involute forms.

It has been found in these cases that the resistance of the workpiece to deformation is so great when structural steels are employed, that turbulence occurs in the material in dependence on the depth of penetration of the tool and this results in faults in the profile and pitch. It is already known to employ profiles which differ from the usual commercial involute and cycloidal toothings, in order to reduce the resistance to deformation. Because pairing of these gears with standarized profiles is not possible, however, such toothings have not been a success in practice.

Methods have also been developed in which the rolling tools are disc-like or screw-like tools mounted transversely of the axis of the workpiece and which act either in a planetary fashion as impact tools or as rolling tools. The range of application of such tooth-forming machines, however, is very limited.

In the known methods, either the rolling tools or the workpiece may be driven, but generally both are driven. The deformation force is transmitted to the workpiece either by simple surface friction or by means of a complicated toothed-wheel gearing.

Efforts to produce accurate tooth pitches have failed again and again because of the fact that the rolling wheels have affected the division of the pitch circle of the workpiece, which corresponds approximately to the starting diameter of the workpiece blank, not according to the length of a calculated tooth pitch, but according to the arc length of the pitch of the addendum circle. Consequently, in the known methods and apparatus, the rolling wheels have a tendency to roll two teeth too few into the surface of the workpiece. The cause of this defect resides in the fact that, in the rolling of cylindrical workpieces, two corresponding rolling cylinders are generated, which cylinders roll relatively to one another on their generated surfaces. The rolling cylinder of the workpiece, which corresponds approximately to its pitch circle diameter, is determined by the starting diameter of the blank. Consequently, on the commencement of the rolling operation, the rolling cylinder of the rolling wheels does not lie on the pitch circle thereof, as would be desirable, but on their addendum circle, which is larger by about 2.2 tooth pitches. At this point, however, the arc length is greater than the pitch circle and, as a result, lengthening of the arc occurs in the pitch of the teeth formed on the workpiece.

The rolling pressure for the plastic deformation of structural steels is such that the driven rolling wheels are able to profile the workpiece by surface friction. However, as the arc length of the addendum circle of the rolling wheel is greater than the arc length of a gear tooth on the pitch cricle, the rolling wheels are compelled to operate according to their own rolling cylinder, namely the circumference of their addendum circle, and accordingly to roll about two teeth too few in each instance.

It has been found that the effect of the rolling cylinder of the rolling wheels is so great that even with synchronously driven workpieces, a periodic lead of the workpiece occurs which can be detected from the non-uniform tooth pitch. Even the inaccuracies in the gearing by means of which the direct or indirect drive of the rolling wheels is effected and the tooth clearances within such gearing are also copied in the toothing of the workpiece.

The result of all these shortcomings has been that the methods known hitherto have been successful in practice only to a limited extent.

It is an object of the invention to provide an improved method by means of which the above-described drawbacks are removed, so as to enable toothings to be produced on cylindrical rotary bodies of all kinds by rolling with an accuracy of profile and pitch which has been achieved heretofore. It is a further object of the invention to produce rolling-wheel assemblies for performing the improved method, and apparatus for carrying the said method into effect.

In carrying out the method according to the invention, the toothing originates from a basic profile which is devoid of edges and is applied to the surface of a cylindrical workpiece in the form of a spiral line by means of at least three simultaneously engaging rolling wheels whose toothing is, in relation to the desired toothing on the workpiece, in the form of a counter-involute. By the term "counter-involute," there is to be understood an involute with respect to the tooth spaces of the gear to be produced. This counter-involute is therefore calculated from rolling cylinders. Thus, the rolling wheels are not formed as counter-profiles with respect to the toothing to be rolled, but as the counter-involute of the toothing to be rolled, the said counter-involute being calculated from the tooth spaces.

By means of this novel profiling of the toothing of the rolling wheels, it becomes possible to reduce the size of the natural rolling circles of the rolling wheels to such an extent that they now coincide with their own pitch circles, so that the rolling cylinders of the rolling wheels and the rolling cylinders of the workpiece correspond to one another. Thus, with the method of the invention, the rolling wheels and the workpieces roll on their pitch circles.

In one convenient mode of carrying the method of the invention into effect, the exact pitch of the toothing of a workpiece is ensure by means of a master wheel with which the rolling wheels mesh and the pitch of which, at the pitch circle diameter, correspond as exactly as possible to the desired pitch. The form of the toothing of the master wheel is moreover the same as that of the workpiece. The decisive factor, however, is the exact pitch of the toothing of the master wheel at the pitch circle diameter.

It is an important feature of the method of the invention that, in order to reduce the deformation resistance of the material, the toothing originates from a basic profile which is devoid of edges. Particularly suitable for this purpose are, for instance, round profiles, elliptical profiles and ellipsoidal profiles. In this way, the production of turbulence is avoided, since the entry profiles of the rolling wheels are adapted to the laws of plastic deformation.

According to a desirable optional feature of the invention, it is furthermore proposed to mount the rolling wheels obliquely with respect to the axis of the workpiece in order to assist the feed and to reduce tool wear, the degree of this inclination being adapted to the feed of the workpiece. The size of this angle, which may be described as the feed angle, is about ¼° to 2°, according to the diameter of the workpiece and the material. The feed obtained by means of this feed angle is calculated by multiplying the sine value of this angle by the circumference of the rolling wheel. With a workpiece diameter of, for instance, 100 mm. and a feed angle of, for example, 1°, a feed of $$100 \times \pi \times \sin 1° = 314 \times 0.0175 = \text{about } 5.5 \text{ mm.}$$

is obtained. In addition, however, a feed force must be exerted on the workpiece, since the slip between the rolling wheel and the workpiece is very great. Only with very small diameters can the feed angle also assume somewhat larger values.

Owing to this oblique mounting of the rolling wheels, the result is obtained that the rolling wheels offer a substantially slide-free or slip-free rolling path which corresponds to a spiral line. Thus, in accordance with this rolling path, the toothing is applied to the surface of the workpiece in the form of a spiral line.

The rate of the workpiece or deformation feed is produced by regulation of the force with which the workpiece is pushed through the rolling wheels. Preferably the workpiece is applied, during this process, against a ram or pusher, which is loaded by means of a hydraulic auxiliary-force device. The effective feed forces arise from, on the one hand, the feed force of the obliquely mounted rolling wheels and, on the other hand, the hydraulic force of the ram. The co-operation of these feed forces renders possible a substantial shortening of the entry cone of the rolling wheels. If required, the length of the entry cone of the rolling wheels can be adjusted to about one half of the width of the toothing or even to a still smaller value.

By means of a brief reversal of the direction of rotation of the rolling wheels, the desired toothing profile can be improved and the surface of the material of the tooth flanks can be compacted evenly.

By special design of the profiling of the rolling wheels it is also possible to produce toothings for unilaterally loaded gear wheels which have different angles of action or mesh, for example 15°, 25° or any other value.

Furthermore, in order to protect the rolling wheels, the rolling pressure is reduced to zero after completion of the rolling operation by moving the rolling wheels away from the workpiece in the radial direction, so that a small gap of, for example ⅒ of the tooth depth is formed between the rolling wheels and the workpiece. As a result of this precaution, the finished workpiece is ejected without any friction.

Other improvements and advantageous developments of the invention will become apparent from the following description with reference to the accompanying drawings which show, by way of example only and in simplified form, one construction of apparatus, including rolling wheels, for carrying the method of the invention into effect. In the drawings.

The machine which is illustrated in the drawings by way of example, and which serves to carry the invention into effect, has a body A (see FIGURES 1 and 2) in which there is mounted a shaft 34 from which the individual parts of the machine are driven. The shaft 34 is driven by way of a V-belt 35, from an electric motor (not shown) which is mounted in the lower part of the machine body A, by means of a drive pulley 89 and driven pulley 90, which is mounted on the shaft 34.

Figures 1, 1A:
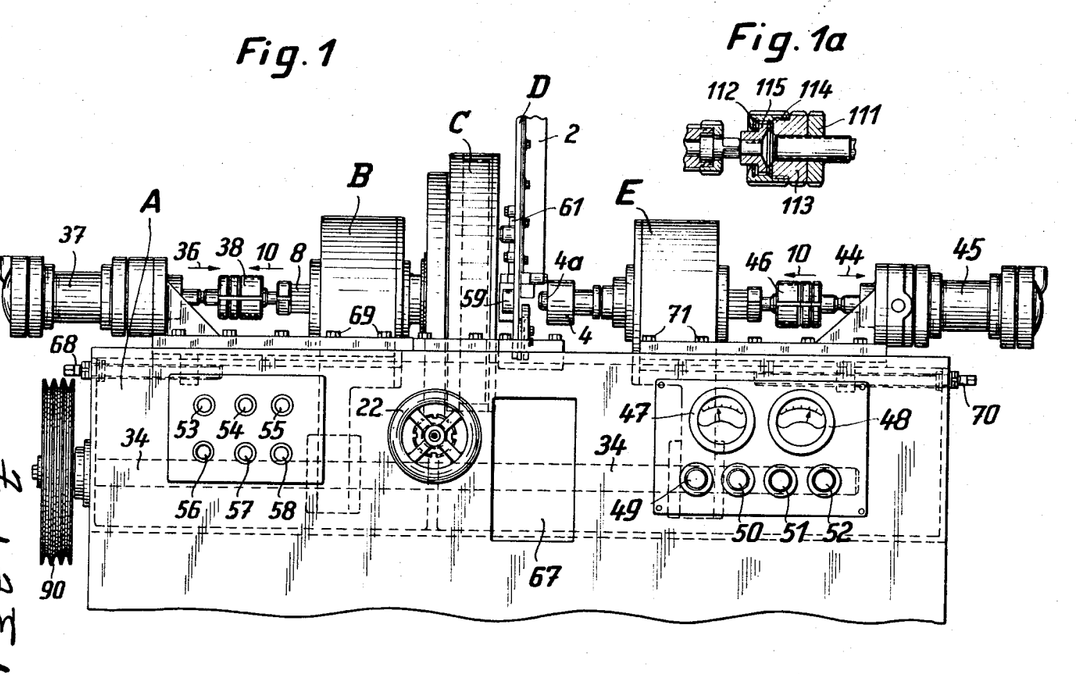
FIGURE 1 is a side view of a fully automatically operating apparatus in accordance with the invention, for producing a spur gear.
FIGURE 1a is a partial section through an axial clutch used in the apparatus of FIGURE 1, for employing a hydraulic auxiliary-force device in conjunction with, on the one hand, the ram and, on the other hand, the master wheel.
Figure 2:
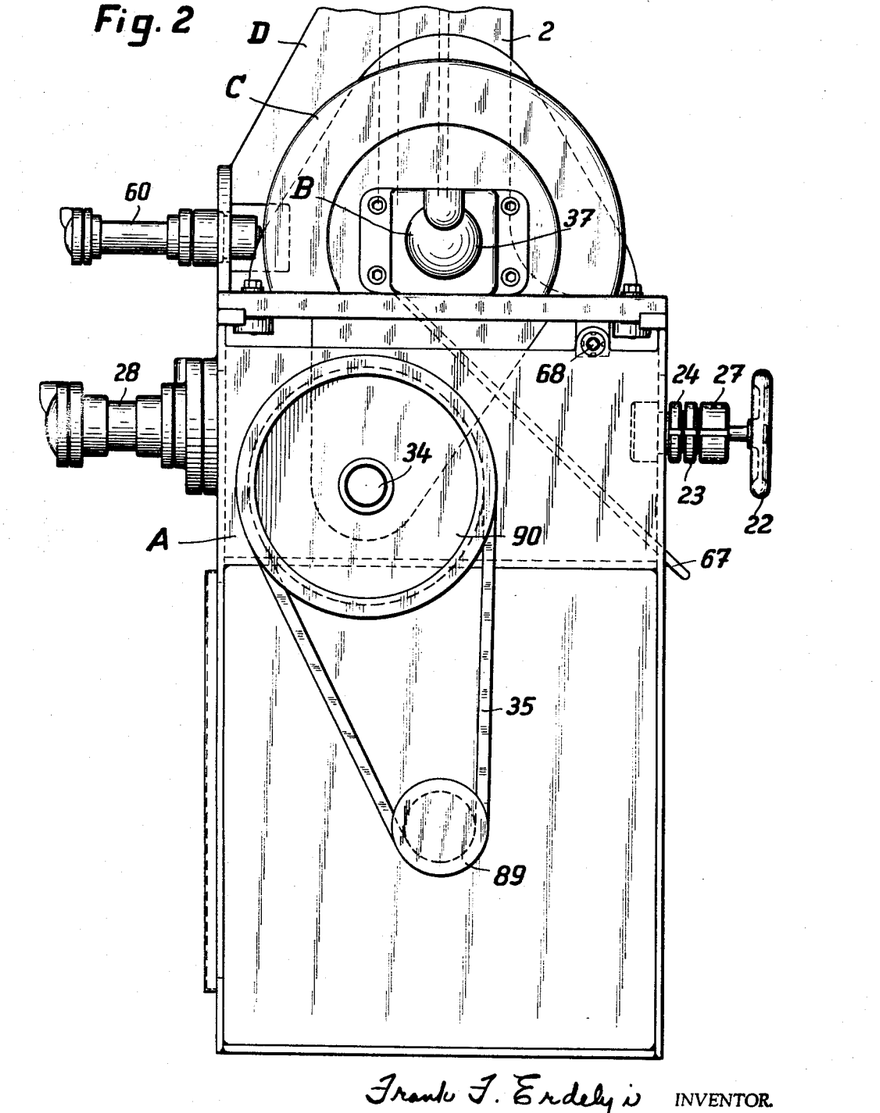
FIGURE 2 is an end view of the apparatus of FIGURE 1, as seen from the side where the master wheel is located.
Figure 3:
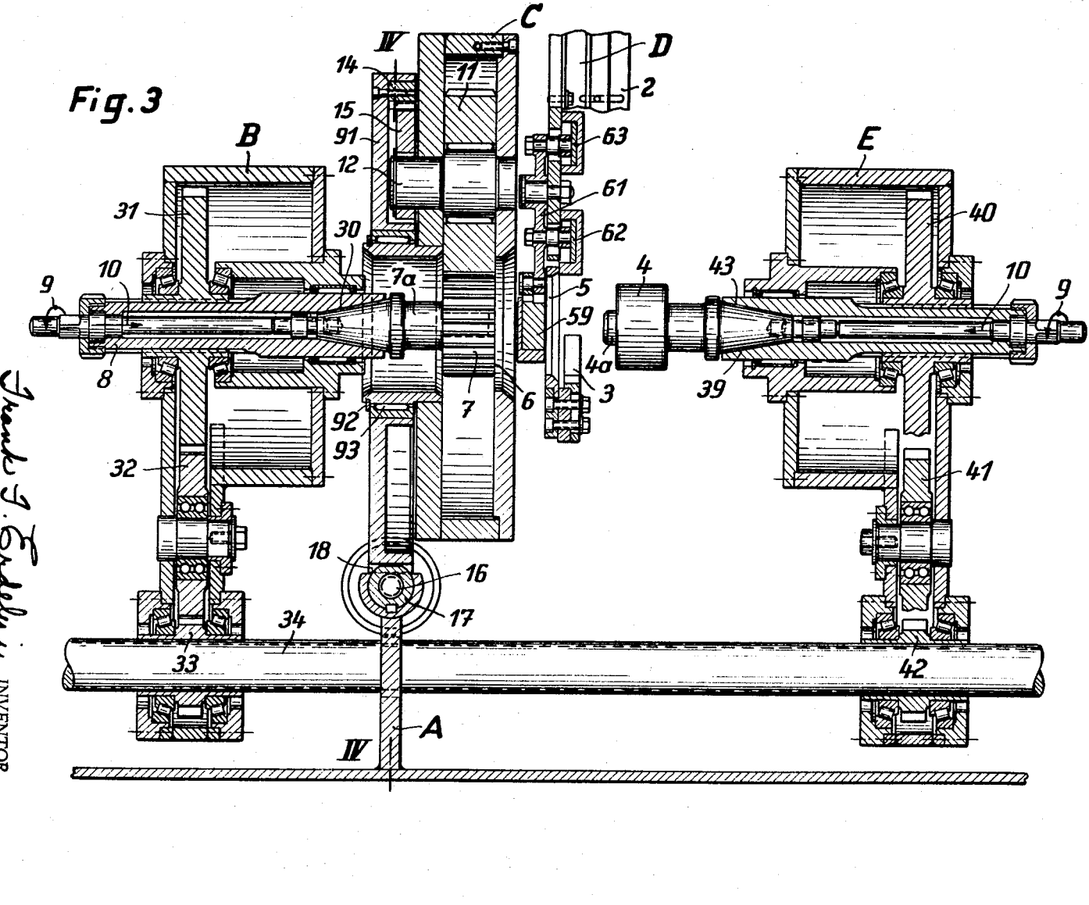
FIGURE 3 is a longitudinal section through parts of the transmission of the apparatus of FIGURE 1, illustrating the ram, the ejector and the rolling wheels, together with the master wheel.

Housing units B, C, D and E are mounted on the machine body A (see particularly FIGURE 1). The housing unit B serves for mounting a master wheel 7 (see FIGURE 3) which serves as an ejector at the same time. The housing unit C serves for mounting the rolling wheels, while the housing unit E serves for mounting the ram or pusher. The housing unit D accommodates a supply container and also the parts which serve to deliver the workpieces and to carry away the finished rolled gear.

Figures 5, 6:
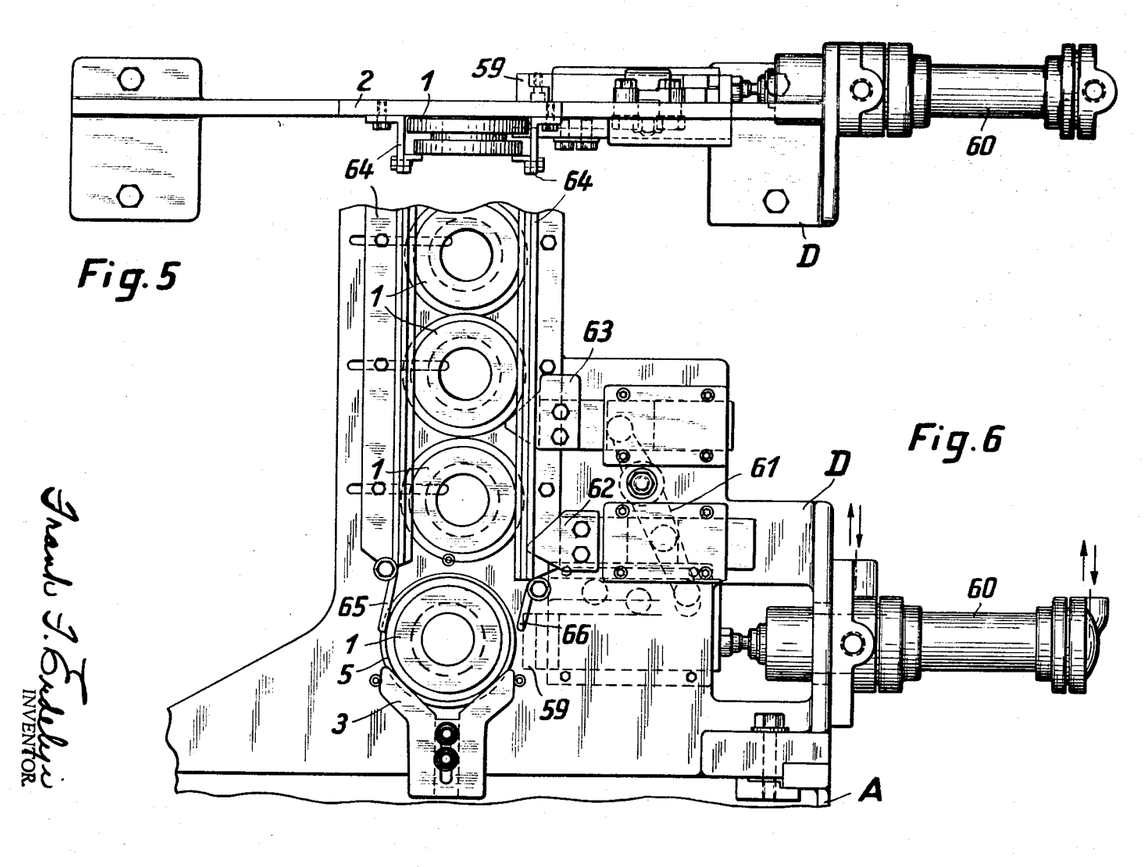
FIGURE 5 is a view of the supply container used in conjunction with the apparatus of FIGURE 1, as seen from above.
FIGURE 6 is a side view of the supply container shown in FIGURE 5.

A workpiece 1 (see FIGURES 5 and 8) is brought from a supply container 2, either by hand or, preferably, under gravity, into the loading position in which it is supported on, for example, a workpiece support 3 and from the loading position it is brought by means of a ram 4 through a centering sleeve 5 into the working position.

Before the commencement of the rolling operation, the workpiece 1 strikes against the end face 6 of the master wheel 7, where it is laterally centered and clamped. After the workpiece has been clamped in positon, a rotary movement 9 and, at the same time, a feed movement are imparted to the ram 4 and to the master wheel 7, whereby the rolling operation begins.

The pitch of the toothing of the master wheel 7 must correspond as exactly as possible to the desired pitch of the gear to be rolled. Moreover, the form of the toothing of the master wheel is like the toothing of the workpiece in other respects.

For the purpose of centering the workpiece 1, it is also possible to provide the ram 4 with a centering projection 4a which co-operates with a corresponding centering bore in the workpiece. The end face 6 of the master wheel 7 could also be provided for the same purpose with a centering bore or a centering projection to co-operate with corresponding centering means on the blank.

As already explained hereinbefore, the housing unit C serves for mounting the rolling wheels. In the embodiment being described by way of example, three rolling wheels 11 are provided; they are distributed uniformly around the periphery and arranged around the common axis of the workpiece 1 and the master wheel 7. In order to ensure exact centering of the workpiece and accurate tooth formation thereon, at least three rolling wheels must be provided.

Eccentric pivots 21 (see FIGURES 4 and 7) serve for mounting the rolling wheels 11, by means of which the rolling wheels 11 are mounted so as to be freely rotatable, with the aid of needle bearings 100. The eccentric pivots 21 are eccentric with respect to bearing pins 12 which are mounted so as to be freely rotatable in the housing unit C. The axis 101 of each pin 12 (see in particular FIGURE 7) is inclined by a small amount, preferably between ¼° and 2°, with respect to an axis extending parallel to the common central axis of the master wheel 7, the ram 4 and the workpiece. The plane of each rolling wheel is also inclined by the same amount in a corresponding manner. This inclination is effected in a plane tangential to a cylinder whose center is located on the axis of the master wheel.

The master wheel 7 has in any case a tooth slope which corresponds to the tooth slope of the toothing which it is desired to form. The tooth slope of the rolling wheels 11, however, must be selected in accordance with the oblique mounting of their axis 101. Thus, if the axis of a rolling wheel 11 is adjusted obliquely by, for example, 1° in accordance with a spiral angle of 1° to the right, in order to produce a straight-toothed spur wheel the tooth slope of the toothing of the rolling wheels 11 must be arranged to be inclined to the left by 1°, so as to obtain a toothing of the workpiece which is parallel to the axis. Correspondingly, when a helical-toothed workpiece is to be produced, the amount of inclination of the axis 101 must be allowed for in selecting the tooth slope of the rolling wheels.

The rolling wheels 11 mesh with the toothing of the master wheel 7 and the embodiment which is being described by way of example, they are driven from the latter. However, the rolling wheels could instead be driven directly. Moreover, instead of either of these possibilities, it would also be possible to drive the workpiece.

The master wheel 7 is mounted in a sleeve 8 which is rotatably mounted in the housing unit B. The ram or pusher 4 is mounted in corresponding manner in a sleeve 39 which is rotatably mounted in the housing unit E. In the embodiment being described, both the master-wheel sleeve 8 and the ram sleeve 39 are driven rotatively from the driving shaft 34 in a manner which will be more fully described hereinafter.

The arrangement of the axes 101 of the bearing pins 12 of the rolling wheels 11 in an inclined position is employed in order to assist the feeding movement 10 of the workpiece and to reduce tool wear. As has already been explained above, the angle of inclination 13 is generally dependent on the diameter of the workpiece and on the feed rate; it may therefore range from about ¼° to about 2° in a given case.

A wheel 91 which may be actuated hydraulically or in some other manner is provided for adjusting the deformation pressure, the said wheel being loosely mounted on the housing unit C and being loosely rotatable about the axis of the master wheel 7. To this end, there is provided on the housing unit C a concentric bush 92 on which the wheel 91 is rotatably mounted by means of a needle bearing 93. The wheel 91 is equipped with three exchangeable toothed segments 14 which together form an internal toothing meshing with toothed segments 15 secured on the obliquely mounted pins 12. Hence, the toothed segments 15 and the toothed segments 14 together form a gearing or transmission.

In addition to the toothed segments which form the internal toothing, an external toothing 18 is provided on the outer periphery of the wheel 91 and this meshes with a rack 17. The rack 17 is in the form of a threaded sleeve, the internal threaded bore 94a of which is screwed on to the thread 94 of a threaded spindle 16.

The rack 17 engaging with the toothing serves to adjust the wheel diameter and the toothing depth. The rack 17 is engaged with the toothing 18 of the wheel 91, so that an axial movement 19 or 19a of the threaded spindle 16 causes a turning movement of the eccentric shafts 12, 21. The position of the rack 17, and thus the positions of the eccentrics 21 and the radial position of the rolling wheels 11, are adjusted by turning the threaded spindle 16 by means of a handwheel 22.

Figure 4:
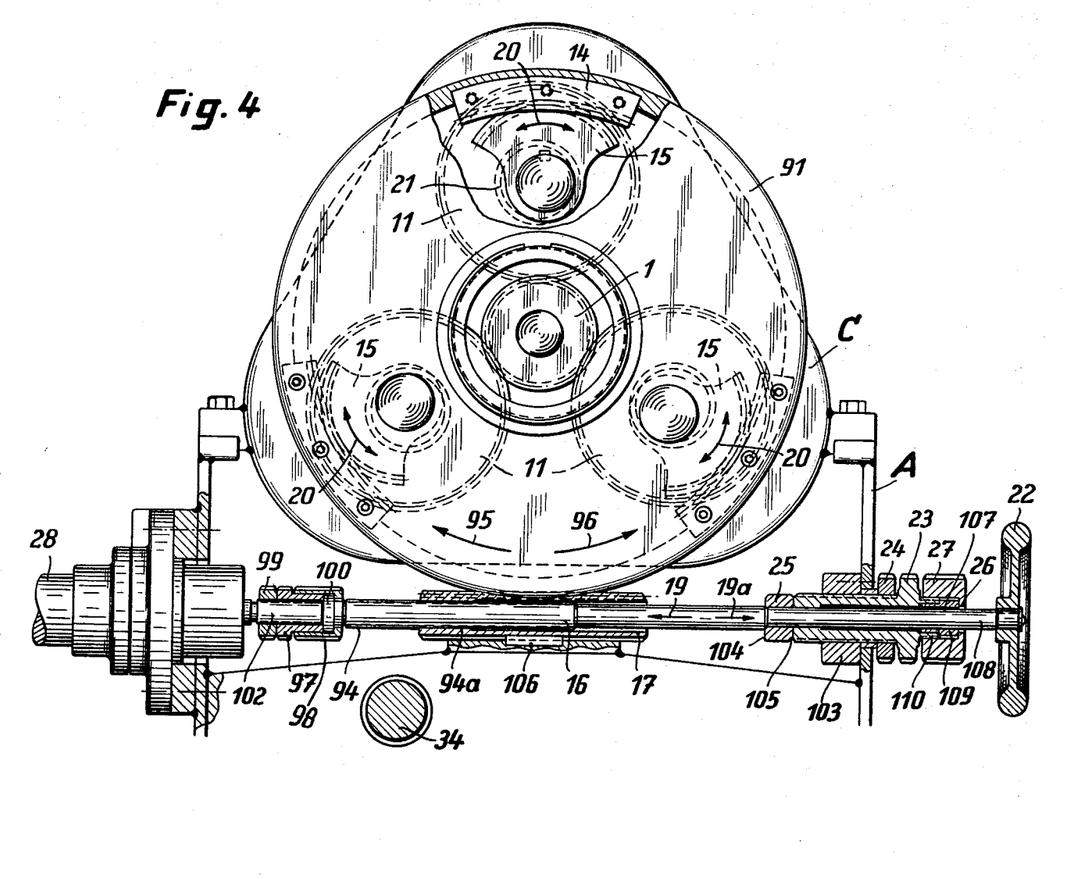
FIGURE 4 is an elevation of the transmission-parts shown in FIGURE 3, partly in section on the line IV—IV of FIGURE 3.

The arrow 95 in FIGURE 4 indicates the direction in which the wheel 91 rotates when the rolling wheels are to be moved out of rolling engagement with the workpiece. The arrow 96 indicates the direction of rotation of the wheel 91 when the rolling wheels 11 are to be brought into the working position.

To reduce wear of the rolling wheels, they are relieved of pressure after completion of the rolling operation. The amount of the pressure relief is adjusted by varying the limits of the axial movements 19 and 19a of the threaded spindle 16.

The axial movement 19, 19a of the threaded spindle 16 and the forces required for the purpose are produced by a hydraulic auxiliary-force unit 28 which is connected to the threaded spindle by means of a coupling 29. A hydraulic pressure medium can be admitted to this auxiliary-force unit 28 from both sides of the piston (not shown). The coupling 29 consists essentially of two nuts 97 and 98 between which a disc 100 is mounted so that it is freely rotatable but not displaceable axially. The reference 99 designates a lock nut. The nuts 97 and 99 can be screwed on a thread on the piston rod 102 of the hydraulic unit 28, while the two nuts 97 and 98 can be screwed together. Accordingly the piston rod 102, and thereby the piston of the hydraulic unit 28, are connected to the threaded spindle 16 so as to be immovable axially relatively to one another but are relatively rotatable.

In an aperture in the machine body A there is mounted a nut 103 into which there can be screwed a threaded sleeve 23 which can be clamped by means of a lock nut 24 so that it is held fast against rotation. Between an annular shoulder 104 of the threaded spindle 16 and the inwardly directed end face 105 of the threaded sleeve 23 there is arranged, on the spindle 16, a ring 25 which serves to reduce the surface pressure. The axial position of the end face 105 of the threaded sleeve can be varied by screwing the sleeve in or out. This end face 105 serves, with the interposition of the ring 25, as an adjustable abutment for the annular shoulder 104 of the threaded spindle 16. Normally, however, the threaded sleeve 23, and thus the position of the ring 25, do not need to be adjusted from the outside. On the contrary, prior to the rolling operation, the depth of engagement of the rolling wheels 11 is varied by axial movement of the rack 17, which is prevented from performing any turning movement by means of a spring 106 which engages in a corresponding recess in the machine body A. Thus, by rotation of the threaded spindle 16, the rack 17 can be moved so that the wheel 91 rotates in the direction of the arrow 96 and the rolling wheels are closed. This is effected to such an extent that they mesh precisely with the toothing of the master wheel without any play.

As has already been explained above, the rolling wheels 11 are relieved of pressure after completion of the rolling operation. To this end, the threaded spindle 16 is provided with an axial groove 107 in which there engages, after the fashion of a key, a spring 108 which is integral with a bush 109. The bush 109 is arranged between a projection 110 on the threaded sleeve 23 and a collar provided on a nut 27 which can be screwed on the projection 110.

By means of the connection consisting of the parts 107 and 108 and of the nut 27, the threaded spindle 16 is connected to the threaded sleeve 23, which is itself connected to the housing A, in such a way that it is displaceable axially but fast against rotation relatively to the said sleeve, the bush 109 being clamped between the nut 27 and the threaded sleeve 23. During the rolling operation, pressure is applied to the piston of the hydraulic unit 28 from the left (FIGURE 4), while the annular abutment 104 is supported against the end face 105 of the threaded sleeve 23 by means of the disc 25. When the rolling operation has been completed, pressure is applied to the piston of the hydraulic unit 28 from the other side, that is from the right in FIGURE 4. The threaded spindle 16, together with the rack, is now moved back by a certain distance as far as a stop, which can be provided at any point. For example, the stop action can be provided by the piston of the hydraulic unit being applied against its cover. However, the stop action may also be provided by, for example, the coupling 29 being applied against a corresponding part of the housing of the hydraulic unit 28. Owing to this axial movement 19 of the rack 17, the wheel 91 is moved in the direction of the arrow 95, whereby the rolling wheels 11 are relieved of pressure. When this pressure-relieving action takes place, the abutment ring 25 moves away a little from the end face 105. The extent of this axial movement is defined by the distance at any given time between that side of the nut 27 which is on the right in FIGURE 4 and the handwheel 22.

As already stated hereinbefore, the rolling wheels 11 can be driven in any desired manner. In the constructional form of the invention being described by way of example, a central drive is chosen in which the master wheel 7 serves at the same time as a driving wheel for the rolling wheels 11. The master wheel 7, upon the accuracy of which the accuracy of the pitch of the workpiece depends, is mounted in a throat-shaped opening 30 in the ejector sleeve 8 which is mounted in a driving gear 31 so as to be fast against rotation but axially slidable relatively thereto. In turn, the driving gear 31 is mounted rotatably in the housing B and meshes with a gear 32 which meshes in turn with a gear 33 driven by the driving shaft 34.

Provision is made for axial movement 10 in one direction and axial movement 36 in the opposite direction of the ejector or master-wheel sleeve 8. In connection with these movements, a hydraulic unit 37 is provided which is connected to the ejector sleeve 8 by means of a coupling 38. The construction of the coupling 38 corresponds to the construction of the coupling 46 which will be discussed hereinafter and which is shown in detail in FIGURE 1a. These couplings serve to connect the piston, and thus the piston rod, of a hydraulic unit to the associated sleeve in such a way that it is rotatable but axially fixed relatively thereto. In each case a thrust plate 115 is provided which is connected to the sleeve, that is to say, in the case of the coupling 38, to the ejector sleeve 8. The thrust plate 115 is supported, by means of inter- posed anti-friction bearings, on nuts 112 and 113 which are connected together by means of a screw joint 114 (see FIGURE 1a). The nut 113 is screwed on to the threaded end of a piston rod connected to the piston of the associated hydraulic unit, in the present case the unit 37. The position of the nut 113 is fixed by means of a lock nut 111. Arranged opposite the ejector sleeve 8, but on the same axis with it, is the sleeve 39 of the ram 4; this sleeve is mounted to be freely rotatable in the housing E. Moreover, in the embodiment being described, as can be seen from FIGURE 3, it is driven by the application of force. Due to the fact that the workpiece is driven by the application of force, the exact tooth pitch is ensured on the one hand and reduction of the wear of the rolling wheels is obtained on the other hand. The ram sleeve 39 is driven from the common driving shaft 34 by means of gearing comprising toothed wheels 40, 41 and 42, the gear wheel 40 being rotatably mounted in the housing E and being connected to the ram sleeve 39 in such manner that the latter is fast rotatively therewith, but axially slidable.

The ram 4, which is designed to suit the shape of the workpiece 1, is connected to the sleeve 39 by a conical joint 43, the sleeve being capable of performing an axial movement 10 and an axial movement 44 in the opposite direction thereto. A hydraulic unit 45 serves to carry out these movements, the hydraulic unit being connected to the ram sleeve 39 by way of the previously mentioned coupling 46. As already stated, the construction of this coupling is shown in detail in FIGURE 1a and corresponds to the construction of the coupling 38.

The rate at which the feed movement 10 of the ram 4 takes place, which rate must be adapted to the diameter and the feed angle of the rolling wheels and the rolling speed, is determined by adjusting the liquid flow of the hydraulic units 37 and 45. The feed force of the rolling wheels 11, which are mounted obliquely at the feed angle 13, must also be taken into consideration in this connection.

Pressure can be applied to the piston (not shown) of the hydraulic unit 45 from both sides, while pressure can be applied to the piston of the hydraulic unit 37 only from one side, namely from that side which is on the left in FIGURE 1.

In order to roll a gear wheel, pressure is applied to the piston of the hydraulic unit 45 from the right in FIGURE 1, the feed movement 10 then being carried out both by the ram sleeve 39 and by the ejector sleeve 8. During this movement, the hydraulic pressure medium flows off in a throttled state from the working space of the hydraulic unit 37 in a manner not shown in the drawing so that, during the rolling operation, the hydraulic unit 37 supplies the abutment pressure.

The deformation pressure of the rolling wheels is determined by adjusting the hydraulic pressure of the pressure medium which is supplied for admission to the hydraulic unit 28, the pressure medium being admitted to the hydraulic unit 28 from the left in FIGURE 4 during this process. The hydraulic unit is provided with an excess-pressure or safety valve (not shown in the drawings), so that even in the event of possible mechanical failure, the rolling wheels 11 are still protected against overloading. A pressure gauge 47 is provided for adjusting the deformation pressure and for keeping a check thereon and another pressure gauge 48 serves for adjusting the feed rate. Moreover, throttle valves 49, 50, 51 and 52 are provided for adjusting the deformation pressure and the feed rate, these valves controlling the hydraulic units 28 and 37 (one valve for each) and the two working spaces of the hydraulic unit 45 (likewise one valve for each). Electric operating buttons and pilot lamps 53, 54, 55, 56, 57 and 58 are provided for the driving motor (not shown) and for the hydraulic pumps and cooling pumps (likewise not shown).

After the main deforming operating has been completed, the tooth profiles of the workpiece are further improved by briefly reversing the direction of rotation of the rolling wheels 11. To this end, the direction of rotation of the driving shaft 34 is reversed. The counter-involute toothing of the rolling wheels 11 nevertheless still remains in engagement with the rolled profiles of the workpiece, the surface being now merely improved and compacted and the profile being corrected.

In the meantime, the two working spaces of the hydraulic unit 45 can be left without any pressure being applied therein, only the hydraulic operating medium from the side to which pressure has been applied up to this point now flowing away, by way of a throttle valve for example. This is necessary even if the workpiece 1 has been clamped between the ram 4 and the end face 6 of the master wheel 7 only by the application of force. The hydraulic pressure medium flowing off by way of the throttle valve now in turn supplies the abutment force which, during the operation of improving the profile and compacting the surface, is naturally far smaller than during the rolling operation proper.

The hydraulic unit 28 is next operated in the opposite direction, whereby the rolling wheels 11 are moved out of engagement with the workpiece to such an extent that the workpiece is released. The hydraulic unit 37 of the ejector sleeve 8 has already been changed over beforehand to the opposite direction. The hydraulic unit 45 of the ram sleeve 39 is now also changed over to the opposite direction, pressure now being applied by means of hydraulic pressure medium to the piston of this hydraulic unit from the left in FIGURE 1. In this way, the ejection of the finished rolled gear is carried out. During this movement of the ejector, the ram sleeve 39 can readily be moved back more quickly than the ejector sleeve 8, since the workpiece 1 does not now need to be held by the application of force.

For ejecting the finished workpiece there is provided in the housing unit D, in which the supply container is also arranged, a slide 59 actuated by a hydraulic unit 60. Connected to the slide 59 is a lever 61 which in turn actuates two slides 62 and 63 which act in opposite directions and permit the workpieces to drop in one only at a time.

Two adjustable rails 64, 64 and movable flaps 65, 66 are arranged on the supply container for the purpose of adjusting the latter for the various shaps and workpiece diameters. The workpiece support 3, which is arranged to be slidable, is in the form of a prism, so that the central position of the workpiece 1 can be adjusted. The workpiece 1, when in the rolling position, is pushed through by means of a centering sleeve 5. The bore of the centering sleeve, which is chosen to suit the diameter of the workpiece blank, is such that the blank can pass freely, but the finished toothed workpiece, which has a diameter which is larger by twice the modulus, is held in the ejector chamber. When the workpiece is trapped in this way it either drops out of its own accord or is expelled by an ejector slide 59. It leaves the apparatus through a chute 67 and is collected in a container.

A threaded spindle 68 is arranged in the machine body A for adjusting the rolling length, the said threaded spindle being capable of shifting the unit B carrying the master wheel 7 in the axial direction. When adjustment has been effected, the housing unit B is fixedly connected to the machine body A by means of bolts 69.

The housing unit C carrying the rolling wheels 11 can, it is true, be exchanged as required, but it is always fixedly connected to the machine body A. The unit D carrying the supply container can be shifted as required in the axial direction of the machine and can be fixed in its new position. If manual feeding is employed, however, it can also be dismantled and removed.

The position of the housing unit E carrying the ram 4 is adjusted by means of a threaded spindle 70, according to the length of the workpiece, and the unit E is then fixedly connected to the machine body A by means of bolts 71.

As has already been stated above, in order to ensure exact profiling the teeth of the workpiece 1, the toothing of the rolling wheels 11 is formed as the counter-involute 76 of the desired toothing of the workpiece, which counter-involute is calculated from the tooth spaces (in this connection see FIGURES 9 to 14). The entry cone of the toothing of the rolling wheels is selected as required to suit the plastic deformation characteristics of structural steels and other metals. In FIGURES 9 to 14, the pitch circle diameter is indicated in each case by the line 0—0. To reduce the resistance to deformation, the rolling wheel profiles are formed from basic profiles devoid of edges, for example, the circular arc profile 72 of FIGURE 9, the elliptical profile 73 of FIGURE 10, the ellipsoidal profile 74 of FIGURE 11 or the prismatoidal profile 75 of FIGURE 12, or from combinations of these or similar profiles. As shown at 79 and 80, the entry side 77 and the exit side 78 of the rolling wheels 11 are of conical form, or have the form of a parabolic section 81, 82 or 83, whereby the volume of material to be displaced represents the reciprocal value of the deformation path 85 and is in equilibrium therewith. In this way, the loading of the toothing of the rolling wheels is distributed uniformly over the entry zone. The rolling wheels 11 are protected particularly in this way against local overloading.

The entry cones 79 or 83 of the rolling wheels 11 are adapted to the flow properties of the material of the blank. By means of suitable formation of the entry-cone at either side, the rolling wheels can consist of any selected combinations of basic profiles and conical shapes. This also applies as regards the fact that the individual teeth of the counter-involute toothing of the rolling wheels may be built up out of different ones of the basic profiles 72, 73, 74 and 75. In this way with, for example, three rolling wheels, it is possible to obtain three different passes over the material of the blank and this, in certain circumstances, can result in compacting of the surface and improvement of the profile.

By designing the toothing of the rolling wheels 11 as the counter-involute with respect to the workpiece to be rolled, it is possible to produce for gear wheels which are loaded at one side only, solely by rolling, a toothing having different angles of action or mesh, for example 15° and 25°. Suitable formation of the entry-cone at both sides of the rolling wheels, moreover, enables the counter-wheel to be rolled with the same set of rolling wheels, since the rolling wheels only require to be swung through 180°, and a corresponding master wheel 7 for the asymmetrical toothing can be made. The master wheel 7 may, however, be mounted on its axle 7a. Hence, it can itself be mounted swung through 180° and the "counter-wheel" can be used to its full value.

Figure 10:
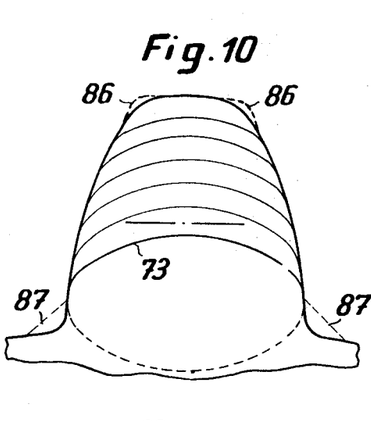
FIGURE 10 is a side view of the profile of the toothing of a rolling wheel, the basic profiles of which originates from ellipses.
Figure 11:
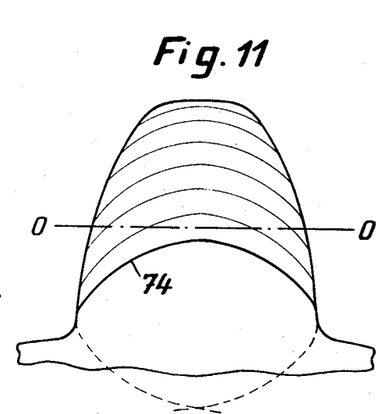
FIGURE 11 is a side view of the profile of the toothing of a rolling wheel, the basic profiles of which originate from ellipsoids.
Figure 12:
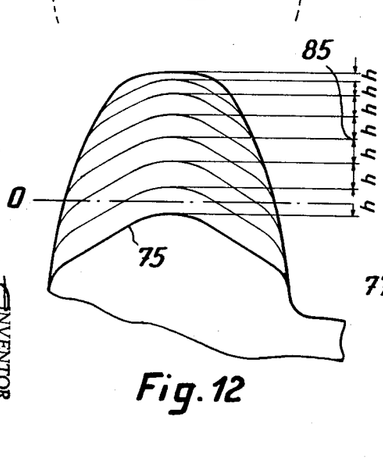
FIGURE 12 is a side view of the profile of the toothing of a rolling wheel, the basic profiles of which originate from prismatoids.
Figure 13:
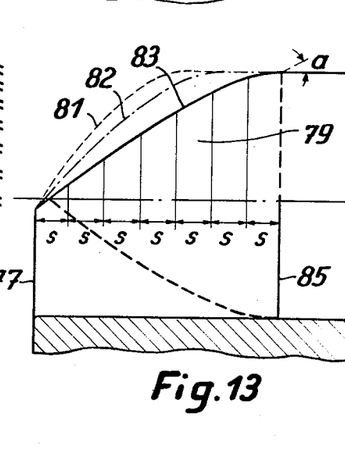
FIGURE 13 is an axial section through the rolling cone of a rolling wheel designed according to the invention.
Figure 14:
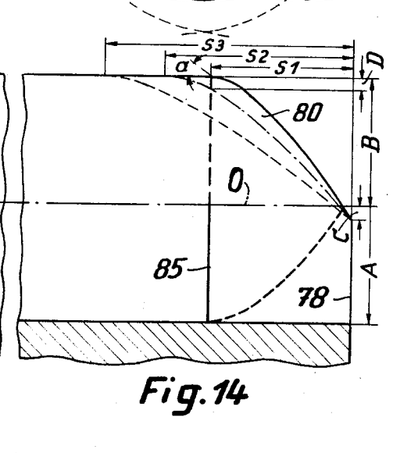
FIGURE 14 is an axial section through the rolling cone of a rolling wheel designed according to the invention, taken from the other side of the wheel.

By means of profile-correction similar to the correction 86 in FIGURE 10, it is possible to roll undercut gears which are afterwards to be ground. By a further correction 87 of the rolling wheels toothings, the top edges of the workpiece can be broken.

Figures 7, 8:
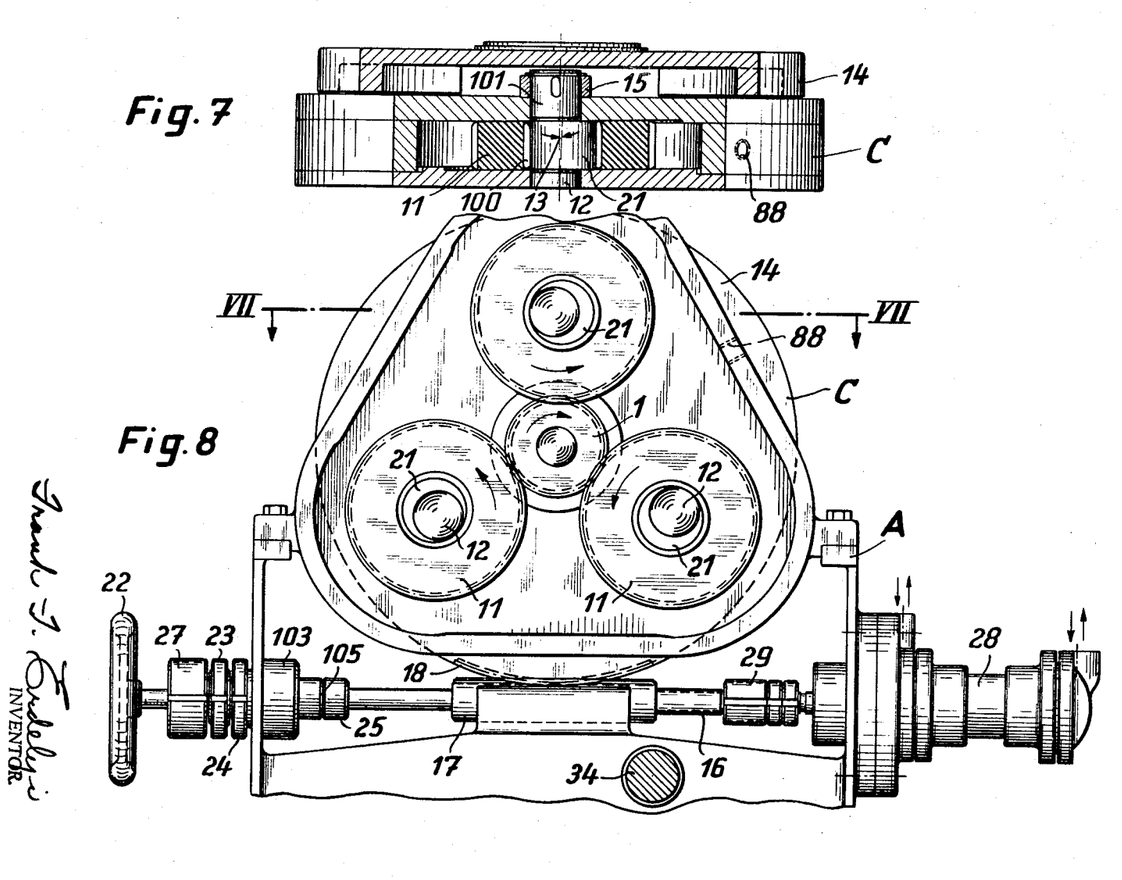
FIGURE 7 is a partial setcion through a bearing of a rolling wheel on the line VII—VII of FIGURE 8.
FIGURE 8 is an elevation of the bearing and the drive of a rolling wheel, as seen from the side on which the ram is located in FIGURE 1.
Figure 9:
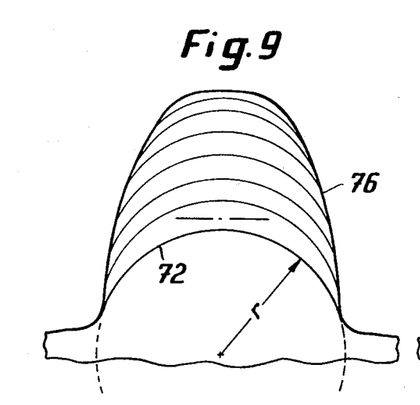
FIGURE 9 is a side view of the profile of the toothing of a rolling wheel, the basic profile of which is composed of circular arcs.

Cooling of the workpiece may be effected during rolling, the reference 88 in FIGURES 7 and 8 indicating a pipe connection for the supply of cooling medium.

The step of effecting the feed by the combined effect of the inclined position of the rolling wheels and the exertion of a feed force on the ram sleeve 39 ensures that the wear on the counter-involute toothing of the rolling wheels remains small, since the slip between the toothing of the rolling wheels and that of the workpiece is reduced to a minimum. Only when the rolling wheels are actuated in the opposite direction in order to obtain improvement of the rolled surface is greater slip deliberately permitted between the flanks of the teeth of the counter-involute toothing of the rolling wheels and the flanks of the teeth on the rolled workpiece.

A further application of the invention consists in using the method and apparatus described in the after-profiling of pre-milled toothings or of toothings pre-worked in some other way. The after-profiling of the preworked toothings can be carried out in the manner described hereinbefore, but it can also be effected in a continuous process in which the workpiece 1 is driven from the ram sleeve and/or from the rolling wheels. The rolling wheels 11 may then be driven either by the toothed workpiece or from the driving shaft 34. If the rolling wheels are driven, the unit B which includes the master wheel 7 can be put out of action in view of the fact that the workpiece has already been toothed. In this case, the workpiece 1 does not need to be withdrawn positively; it is pushed out of range of the rolling wheels automatically due to the feed effect resulting from the inclined position in which the rolling wheels are mounted. The actual working cycle is thereby substantially accelerated.

What I claim is:

1. Apparatus for forming gears having teeth by rolling comprising, in combination, a frame, first and second axially aligned spindles rotatably mounted on said frame for axial movement toward and away from each other, first means in rotatable driving connection with said spindles, second and third means connected to said first and second spindles, respectively, selectively axially translating and positioning the associated spindle, a master gear wheel mounted upon said first spindle, a rolling gear wheel housing mounted on said frame substantially intermediate said spindles, at least one rolling gear wheel rotatably about an axis radially spaced from said axis of said spindles mounted on said housing, said rolling gear wheel adapted to directly mesh in driven connection with said master wheel upon said wheels being radially aligned, and workpiece positioning means defined on said first spindle adjacent said master wheel and in opposed relation to said second spindle whereby a workpiece to be rolled is positionable between said first and second spindles adjacent said master wheel and said master wheel drives said rolling gear wheel while said rolling gear wheel engages the workpiece.

2. In apparatus for forming gears as in claim 1, rolling gear wheel supporting means mounted on said housing, and adjustment means mounted on said housing selectively adjusting said supporting means for moving said rolling gear wheel in a radial direction with respect to said master wheel and said axis of said spindles.

3. In apparatus for forming gears as in claim 1, three similar rolling gear wheels rotatably mounted on said housing in radial alignment and equally spaced from said axis of said spindles adapted to mesh with said master wheel in driven connection upon radial alignment therewith.

4. In apparatus for forming gears as in claim 3, adjustable supporting means mounted on said housing supporting said rolling gear wheels for simultaneous radial movement toward and away from the axis of said spindles.

5. Apparatus for forming gears as in claim 1 wherein the axis of rotation of said rolling gear wheel is obliquely related to said axis of said spindles.

6. Apparatus for forming gears as in claim 1 wherein said second and third means comprise expansible motors, and control means controlling operation of said motors whereby the rate of axial translation of said spindles and a workpiece held therebetween past said rolling gear wheel may be accurately regulated.

7. Apparatus for forming gears having teeth by rolling comprising, in combination, a frame, workpiece supporting means rotatably mounted upon said frame for rotation about an axis and adapted to support and rotate a workpiece in which teeth are to be rolled, a rolling gear wheel rotatably mounted upon said frame about an axis and having a periphery in radial alignment with a workpiece supported upon said workpiece supporting means and adapted to engage the periphery of a workpiece supported upon said supporting means, gear forming teeth defined upon the periphery of said rolling gear wheel, said teeth having a configuration constituting a counter-involute of the teeth to be formed on the workpiece determined from the tooth spacing of the teeth to be formed on the workpiece.

8. Apparatus for forming gears having teeth by rolling as in claim 7 wherein said axis of said rolling gear wheel is obliquely angularly disposed to said axis of said workpiece supporting means.

9. Apparatus for forming gears having teeth by rolling as in claim 7 wherein said teeth defined on said rolling gear wheel have an edge-free basic profile defined by geometrical configurations devoid of edges.

10. Apparatus for forming gears having teeth by rolling as in claim 7 wherein a plurality of rolling gears are rotatably mounted upon said frame equally angularly disposed in a circumferential manner about said workpiece supporting means axis.

11. Apparatus for forming gears having teeth by rolling as in claim 7 wherein a master gear wheel having teeth defined thereon is mounted upon said workpiece supporting means for rotation therewith about the axis thereof, said workpiece supporting means including means concentrically supporting a workpiece adjacent said master wheel, and said rolling gear wheel gear forming teeth directly meshing with said master gear wheel teeth, said rolling gear wheel being of sufficient axial width to permit said gear forming teeth thereof to simultaneously engage the teeth of said master gear wheel and the periphery of a workpiece supported in said supporting means.

12. Apparatus for forming gears having teeth by rolling comprising, in combination, a frame, a spindle rotatably mounted upon said frame for rotation about an axis, a workpiece support on said spindle adapted to hold a workpiece in which teeth are to be rolled for concentric rotation about said axis, a master gear wheel coaxially mounted upon said spindle adjacent said workpiece support, a plurality of rolling gear wheels rotatably mounted upon said frame upon axes radially spaced from said spindle axis and having teeth directly meshing with said master gear wheel, means producing relative movement between said master gear wheel and said rolling gear wheels in the axial direction of said spindle axis, said rolling gear wheels having an axial width in the direction of said spindle axis sufficient to simultaneously engage said master gear wheel and a workpiece mounted upon said workpiece support.

References Cited

UNITED STATES PATENTS

| | | | |
|---|---|---|---|
| 1,068,236 | 7/1913 | Girlot | 72—106 |
| 1,558,086 | 10/1925 | Gustavsen | 72—105 |
| 1,697,823 | 1/1929 | Schurr | 72—103 |

CHARLES W. LANHAM, *Primary Examiner.*

H. DIETER HOINKES, *Assistant Examiner.*